US009255468B2

(12) United States Patent
Reyes et al.

(10) Patent No.: US 9,255,468 B2
(45) Date of Patent: Feb. 9, 2016

(54) CHELATING AGENT-BASED SELF-DIVERTING ACIDIZING FLUIDS AND METHODS RELATING THERETO

(71) Applicant: Halliburton Energy Services, Inc., Houston, TX (US)

(72) Inventors: Enrique Antonio Reyes, Tomball, TX (US); Aaron Michael Beuterbaugh, Spring, TX (US); Alyssa Lynn Smith, Humble, TX (US); Christopher Lynn Smith, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/373,717

(22) PCT Filed: Aug. 30, 2013

(86) PCT No.: PCT/US2013/057594
§ 371 (c)(1),
(2) Date: Jul. 22, 2014

(87) PCT Pub. No.: WO2015/030801
PCT Pub. Date: Mar. 5, 2015

(65) Prior Publication Data
US 2015/0260021 A1     Sep. 17, 2015

(51) Int. Cl.
*E21B 43/16* (2006.01)
*E21B 43/28* (2006.01)
*C09K 8/74* (2006.01)
(Continued)

(52) U.S. Cl.
CPC ............... *E21B 43/16* (2013.01); *C09K 8/426* (2013.01); *C09K 8/528* (2013.01); *C09K 8/74* (2013.01); *E21B 43/28* (2013.01)

(58) Field of Classification Search
None
See application file for complete search history.

(56) References Cited

U.S. PATENT DOCUMENTS 4,359,093 A * 11/1982 Bernard ..................... 166/400
5,293,942 A * 3/1994 Gewanter et al. .......... 166/307
(Continued)

FOREIGN PATENT DOCUMENTS

WO      2006117517 A2   11/2006
WO      2015/030801 A1   3/2015

OTHER PUBLICATIONS

International Search Report and Written Opinion for PCT/US2013/057594 dated May 28, 2014.

*Primary Examiner* — Angela M DiTrani
*Assistant Examiner* — Anuradha Ahuja
(74) *Attorney, Agent, or Firm* — McDermott Will & Emery LLP; Holly Soehnge

(57) ABSTRACT

Complexing-acidizing treatment fluids can be used in various subterranean treatment operations. Some methods include: providing or preparing a complexing-acidizing treatment fluid having an acid concentration of about 0.6 Molar, the complexing-acidizing treatment fluid including: an aminopolylycarboxylic acid chelating agent, an aqueous base fluid, and an acid, placing the complexing-acidizing treatment fluid in a subterranean formation matrix penetrated by a well bore; allowing the acid to generate metal cations by dissolution of the subterranean formation matrix; reacting the aminopolycarboxylic acid chelating agent with the metal cations so as to form at least a plurality of aggregate blocking agents; and allowing the aggregate blocking agents to divert the complexing-acidizing treatment fluid to a main channel in the subterranean formation matrix that is distinct from a wormhole in the subterranean formation matrix.

18 Claims, 4 Drawing Sheets

(51) Int. Cl.
*C09K 8/528* (2006.01)
*C09K 8/42* (2006.01)

(56) References Cited

U.S. PATENT DOCUMENTS

| | | | |
|---|---|---|---|
| 6,436,880 B1* | 8/2002 | Frenier | 507/244 |
| 7,666,821 B2* | 2/2010 | Fu | 507/244 |
| 8,053,397 B2 | 11/2011 | Huang et al. | |
| 2004/0254079 A1* | 12/2004 | Frenier et al. | 507/260 |
| 2006/0142166 A1 | 6/2006 | Thomas | |
| 2008/0139412 A1* | 6/2008 | Fuller | 507/219 |
| 2009/0291863 A1 | 11/2009 | Welton et al. | |
| 2010/0160189 A1* | 6/2010 | Fuller et al. | 507/241 |
| 2010/0276152 A1 | 11/2010 | De Wolf et al. | |
| 2011/0263466 A1 | 10/2011 | Rose | |
| 2012/0097392 A1* | 4/2012 | Reyes et al. | 166/279 |
| 2013/0274155 A1* | 10/2013 | Nasr-El-Din et al. | 507/241 |

* cited by examiner

CHELATING AGENT-BASED SELF-DIVERTING ACIDIZING FLUIDS AND METHODS RELATING THERETO

This application is a 35 U.S.C. §371 national stage entry of International Patent Application No. PCT/US2013/57594 by Enrique Antonio Reyes, filed on Aug. 20, 2013 and entitled "Chelating Agent-Based Self-Diverting Acidizing Fluids and Methods Relating Thereto."

BACKGROUND

This disclosure relates to acidizing fluids for use in subterranean applications, and more specifically, to complexing-acidizing self-diverting treatment fluids and methods relating thereto for use in subterranean formations comprising carbonates.

Methods to enhance the productivity of hydrocarbon wells (e.g., oil wells) or geothermal wells include matrix acidizing, which involves creating flow paths in the formation matrix by differential dissolution of small portions of the formation, or removing (by dissolution) near-wellbore formation damage, with an acid. "Wormholes" (conductive channels) are often generated through the matrix as a result and allow for improved conductivity within the formation. Acidic-based fluids are useful for this purpose due to their ability to dissolve both formation minerals and contaminants (e.g., contaminants such as drilling fluid filter cake on the wellbore or that has penetrated into the formation introduced into the wellbore/formation during drilling or remedial operations).

Acidizing carbonate formations can be challenging due to the relatively rapid reactivity of the carbonate with the acid. For instance, acid treatments in carbonate formations are plagued by at least two complications: (1) radial penetration, and (2) fluid loss of the acidizing fluid into the formation. The first problem, radial penetration, results from the fast reaction of the acid with the formation matrix upon introduction of the fluid in the near well bore region. The radial acid penetration is often limited to just a few inches to a few feet, which is not optimal. Those portions of the formation that are more distal to the wellbore (as one moves radially outward from the wellbore) remain untouched by the acid because the acid will fully spend. In fact, due to such limited penetration, it is believed that acid matrix treatments are limited in carbonate formations to those treatments focused on removing near-wellbore flow restrictions. Yet low permeability at any point along the hydrocarbon flow paths can impede flow (hence production), which is undesirable. Fluid loss of the matrix acidizing fluid into smaller wormholes neighboring the near well bore region only serves to exacerbate this radial penetration problem. Consequently, to try to achieve maximum radial penetration, prodigious fluid volumes are often required, which can prove costly.

One effort to improve radial penetration involves controlling the fluid loss of the matrix acidizing fluid so as to attempt to extend the radial depth of the main channels. Fluid loss in acidizing fluids for carbonate formations is typically controlled by the addition of polymeric gelling agents to the acidizing fluid. These polymeric gelling agents modify the relative viscosity of the treatment fluid, therefore, reducing or eliminating fluid loss flow into the natural permeability within the formation. However, such gels may prove problematic in that they can block conductive channels thereby reducing the conductivity of the formation if they are not removed prior to production. Extra steps are usually necessitated to remove the gel, such as breaking the gel downhole by adding an additional chemical breaker component to the formation and allowing sufficient time to pass to allow that breaker to break the gel, to improve conductivity.

Another method used to combat fluid loss is the use of fluid loss control agents, also known as diverting agents, like sand, quartz, salts, polymeric particles, and degradable particulates such as polylactic acid or polylactide particulates, to bridge the pore throats in the formation. Such agents may present barriers to conductivity as well if they are not removed or degraded for production. Unfortunately, degradation of such particulates can take periods in excess of weeks and even months, especially at temperatures below about 250° F., which is undesirable because that time impacts resource extraction. Another method to combat fluid loss is to emulsify the acidizing fluid. Emulsification involves an additional external component, which adds costs and complexity to the acidizing operation.

Yet another method to combat fluid loss involves the use of viscoelastic surfactants (VES). A VES-containing acidizing fluid often relies on the increase in viscosity when the pH of the treatment fluid increases to a pH where these surfactants transition to a gelled state. This occurs upon reaction of an acid with a source of carbonate, whether in the formation matrix itself or within a proppant pack, and the subsequent release of calcium into the fluid. These types of fluids can present the same sorts of problematic blockages and downtime mentioned above.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

This disclosure relates to acidizing fluids for use in subterranean applications, and more specifically, to complexing-acidizing self-diverting treatment fluids and methods relating thereto for use in subterranean formations comprising carbonates. The treatment fluids disclosed herein can be used to remove inorganic matter from or out of a subterranean formation matrix, the well bore, or the near well bore area.

The complexing-acidizing treatment fluids and methods disclosed herein may be useful in matrix acidizing treatment operations for the removal of scale and/or stimulation procedures. Of particular application, the treatment fluids disclosed herein may be used to redistribute the acidizing fluid to extend its wormhole-generating action in subterranean applications (e.g., through the subterranean formation matrix) of a carbonate formation, or differential etching and/or flow channel generation during a fracture acidizing of such. The treatment fluids disclosed herein should be useful in carbonate subterranean formations having borehole bottom temperatures of up to about 325° F.

The features and advantages of the present invention will be readily apparent to those skilled in the art upon a reading of the description of the preferred embodiments that follows. Of the many advantages of the present invention, one is that the chelating agent in the complexing-acidizing treatment fluids is able to complex with metal divalent and trivalent cations that result from dissolution of the formation material by the acid to form "aggregate blocking agenting agents" in situ. These aggregate blocking agenting agents are believed to block fluid loss of the complexing-acidizing fluids through the smaller wormholes in the formation matrix by plugging the newly created paths or microfractures therein. This results in diversion of the complexing-acidizing fluid to the primary channels formed by the matrix treatment, which is believed to consequently extend the radial penetration of the acidizing treatment. It is notable that no external components, such as polymeric gels or other non-related diverting agents, are required to be included in the fluid to achieve this fluid loss prevention and diversion result. Because the treatment fluids of this disclosure are able to form these aggregate blocking agents in situ without the addition of external components, the complexing-acidizing treatment fluids disclosed herein may be considered "self-diverting," as that term is described herein.

Figure 1:
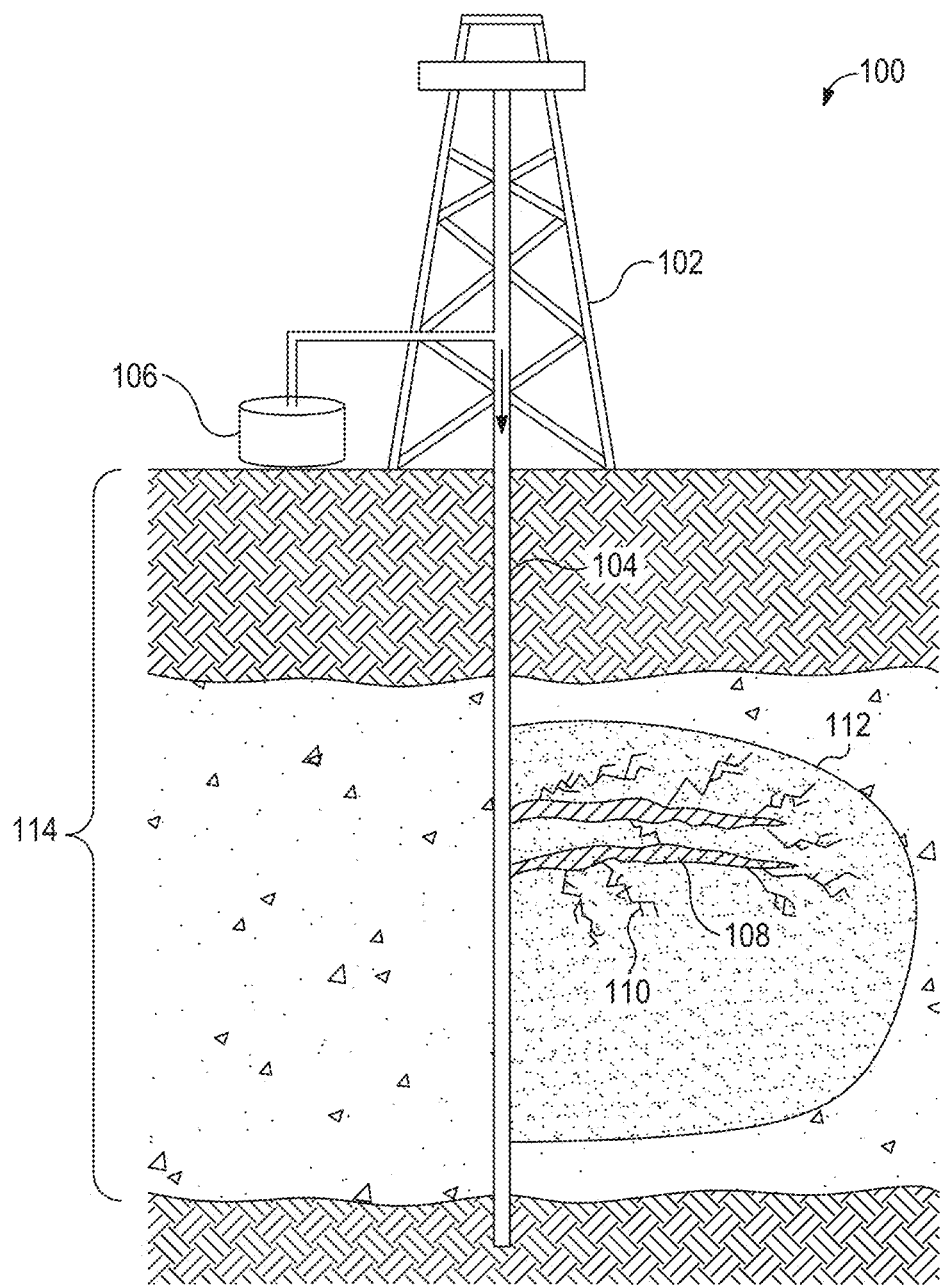
FIG. 1 illustrates wormhole channels or acid-etched fractures formed by a matrix acidizing treatment in a subterranean formation as described herein.

FIG. 1 illustrates this phenomenon as it hypothetically may take place on a well 100. Well bore 104 extends from the well 102 through subterranean formation 114. A complexing-acidizing treatment fluid as described herein may be mixed in tank 106 and placed downhole through well bore 104 (e.g., through a suitable tubing) to perform a matrix acidizing procedure on matrix portion 112 of subterranean formation 114. Typical pumping equipment may be used on the well to place the complexing-acidizing treatment fluid downhole and into the formation matrix. Typical pressures and pump rates associated with matrix acidizing jobs may be used as well to form the wormholes and channels. Generally speaking, these fluids are not injected into the formation at pressures above the fracture gradient. Matrix portion 112 illustrates the channels and smaller wormholes formed in the matrix by the matrix acidizing treatment. An example of a main channel is illustrated at 108. An example of a smaller wormhole is shown at 110. It is believed that the aggregate blocking agents formed by interaction of the chelating agent in the complexing-acidizing treatment fluids of this disclosure with the metal ions generated by dissolution of the formation material by the acid divert flow of the treatment fluid from the wormholes (e.g., 110) to the main channels (e.g., 108), thus extending the radial penetration of the acidizing treatment into the matrix 112 distal from well bore 104.

The aggregate blocking agents are believed to be complexation products formed by the reaction of the chelating agent in the complexing-acidizing treatment fluid with the metal cations present in the formation resulting from the dissolution of the formation by the acid in the complexing-acidizing treatment fluid. The aggregate blocking agents can be described as a non-Newtonian fluid that can be an aggregate, particulates, or a viscous substance like a gel that serves to reduce or impede flow by blocking flow paths emanating from the main channel(s), which diverts flow of the treatment fluid to the main channel(s). In an example of an embodiment, the aggregate blocking agents may be a viscous fluid having a viscosity of about 100 centipoises or more. Notably, this viscous fluid is formed without the need for the addition of traditional diverting agents. The complexation reactions are believed to occur when the acid in the treatment fluid becomes spent and reaches a pH of at least about 5, and preferably 5.5, for instance.

The complexing-acidizing treatment fluids disclosed herein are compatible with filter cake removal fluids. They can be used in a single-stage package, therefore reducing operational time associated with more traditional approaches. External components such as gels, or other nonrelated diverting agents, etc. need not be added to achieve fluid loss control and fluid diversion. This reduces cost and logistical constraints, which are desirable features. Additionally, the flow back fluids from such treatment fluids are easier to dispose, thus offering an overall significantly enhanced environmental footprint. In some embodiments, the fluids may be left in the formation because the chelating agent readily dissolves in brine once the pH of the spent fluid reaches pH of about 6 to about 7.

The complexing-acidizing treatment fluids disclosed herein comprise an acid, an aminopolycarboxylic acid chelating agent, an aqueous base fluid, and optionally, additional additives. Preferably, the pH of the complexing-acidizing treatment fluids when placed downhole should be about 2 or below as described herein.

The fluid also can reach a concentration of dissolved metal ion to chelating agent so as to produce a salt of such product, and generate a particle mixture (randomly distributed) that serves a fluid loss control agent.

Any acid may be suitable for use in the complexing-acidizing treatment fluids described herein that is able to generate a pH of two (2) or lower given the other components in the treatment fluid. Suitable examples include hydrochloric acid, formic acid, methanesulfonic acid, chloroacetic acid (mono-, di-, tri-), trifluoroacetic acid, acetic acid, sulphonic acid. If an acid has a pKa value of greater than two, then such acid would not be suitable for use. When mixing the fluid, for example, in a mixing tank at a well site, the amount of acid to include in a given treatment fluid depends on the other components being used in the fluid, such as the chelating agent, and it will be driven by the need to keep the fluid at a pH of 2 or less. Additional considerations as to how much acid to include are that the fluid should have a sufficient amount of acid to dissolve the desired amount of the matrix thus generating metal cations (e.g., calcium out of the carbonate formation) to allow a sufficient amount of the aggregate blocking agents to form as described above. For instance, at least in some embodiments, to have optimum formation of the aggregate blocking agents, at least 22,000 ppm of calcium ions should be present in situ. To generate this amount of calcium ions, the treatment fluid should have an acid concentration of at least 0.6 Molar. As used herein the term "Molar" is used in its ordinary meaning to refer to solution of concentration 1 mol/L. A person of ordinary skill in the art of designing such fluids with the benefit of this disclosure should be able to build a fluid based on these guidelines.

Acids that are not suitable for use include phosphoric acid, sulfuric acid, hydrofluoric acid and some phosphonic acids. These acids may lead to irreversible, unmanageable side reactions and problems.

Suitable chelating agents should be soluble in pH of two or less in a high concentration of the chelating agent (about 0.6 Molar or higher). Not all chelating agents have these properties. For example, phosphonic acid and citric acid are soluble in these conditions, but precipitate with calcium or ferric ions, which is not suitable for use in this application.

A number of aminopolycarboxylic acids may be suitable for use as the chelating agent in the treatment fluids and methods described herein. A number of these aminopolycarboxylic acid chelating agents may be biodegradable, which is preferable for environmental reasons. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof that is soluble in a pH range of 0 to 2. In some embodiments, as an alternative to or in addition to the aminopolycarboxylic acid chelating agents, traditional chelating agents such as, for example, propylenediaminetetraacetic acid (PDTA), hydroxyethyliminodiacetic acid (HEIDA), diphenylaminesulfonic acid (DPAS), any salt thereof, any derivative thereof, or the like, may be included in the treatment fluids described herein. Particularly suitable biodegradable chelating agents that may be used in the treatment fluids described herein include, for example, MGDA, GLDA, HIDS, EDDS, β-ADA, IDS, TCA6, BCA3, BCA5, BCA6, MCBA3, and MCBA5.

Preferred biodegradable chelating agents for use as described herein include MGDA, TCA6, BCA3, BCA5, BCA6, MCBA3, MCBA5, β-ADA, EDDS, and GLDA.

In some or other alternative embodiments, as an alternative to or in addition to the aminopolycarboxylic acid chelating agents, suitable chelating agents may include hydroxamates. In some or other alternative embodiments, as an alternative to or in addition to the aminopolycarboxylic acid chelating agents, suitable chelating agents may include pyridinecarboxylic acids.

In some embodiments, the chelating agent may comprise the neutral form of the chelating agent. In other embodiments, the chelating agent may comprise a salt form of the chelating agent, including an alkali metal salt of the chelating agent. Other salt forms of the chelating agent may also be used and include, for example, an ammonium salt form or a quaternary ammonium salt form, if available. In some embodiments, the chelating agent may be used in a concentrate form wherein the concentrate also comprises water. An example of a suitable concentrate is a 40% MGDA concentrate that comprises water and MGDA.

In various embodiments, the concentration of the chelating agent in the treatment fluid may range between about 0.1% to about 40% of the treatment fluid by weight. In some embodiments, the chelating agent may be included in the treatment fluid in an amount ranging from a lower limit of about 0.1% by weight, 0.25% by weight, 0.5% by weight, 1% by weight, 5% by weight, or 10% by weight, to an upper limit of about 40% by weight, 35% by weight, 30% by weight, 25% by weight, 20% by weight, 15% by weight, or 10% by weight of the treatment fluid, and wherein the concentration may range from any lower limit to any upper limit and encompasses any subset therebetween.

A preferred concentration of the chelating agent is about 0.6 to 1.5 Molar. An optimized concentration may be about 1 molar to 1.25 Molar. These molar concentrations are based on the mixture of the treatment fluid in the mixing tank when initially mixed. If the chelating agent is delivered or available or provided in a concentrate form, one of ordinary skill in the art will be able to adjust these percentages accurately to formulate a fluid based on the molarity of the concentrate and the desired molarity in the treatment fluid.

The aqueous base fluid in the complexing-acidizing treatment fluids disclosed herein may include any suitable aqueous carrier fluids, for example, fresh water, acidified water, salt water, seawater, brine (e.g., a saturated salt solution), or an aqueous salt solution (e.g., a non-saturated salt solution). When mixed in the tank, keeping in mind the need to keep the pH at 4 or below and preferably 2 or below, mutual solvents such as glycols or glycol ethers may be included if desired. Such aqueous base fluids may be obtained from any suitable source. Solids that may be present in the water can be potentially problematic as they can plug the pore throats in the formation matrix. If such solids are present in the chosen base fluid, it may be preferable to filter them out to reduce the solids content of the fluid prior to addition to the treatment fluid. Given the benefit of the present disclosure, one of ordinary skill in the art will be able to determine a suitable aqueous base fluid for utilization in the embodiments described herein. A person having ordinary skill in the art with the benefit of this disclosure will be able to ascertain whether a pH adjusting acid should be added to the aqueous base fluid to counter any buffering effect of the aqueous base fluid (e.g., sea water).

The amount of the aqueous base fluid to include in an exemplary treatment fluid will be job dependent based on the concentration of the chelating agent and the acid needed to accomplish the designated purpose. If the concentration needed is less, then the amount of the aqueous base fluid to include in the treatment fluid is consequently more. In some embodiments, the aqueous base fluid may be included in the treatment fluid in an amount ranging from a lower limit of about 0% by weight, 2% by weight, 5% by weight, 10% by weight, 15% by weight, or 20% by weight, to an upper limit of about 80% by weight, 75% by weight, 65% by weight, 60% by weight, 55% by weight, 50% by weight, 45% by weight, 40% by weight, 35% by weight, 30% by weight, 25% by weight in the treatment fluid, and wherein the concentration may range from any lower limit to any upper limit and encompasses any subset therebetween.

An exemplary upper limit for the amount of aqueous base fluid to include in a treatment fluid is about 75% by weight. In some highly concentrated embodiments, the minimum amount of water needed is close to or about 0% by weight. A preferred concentration range may be about 35% to 55% by weight by volume of the treatment fluid in the mixing tank.

Optionally, additives may be included in the complexing-acidizing treatment fluids disclosed herein. If desired, the treatment fluids formed in accordance with this disclosure can include additives that are compatible with the low pH of the complexing-acidizing fluids disclosed herein. Examples of suitable additives (when they are compatible at this low pH) are: biocides, corrosion inhibitors, salts, friction reducers, anti-sludging additives, surfactants, and other additives known to those skilled in the art, can be effectively employed with the fluids disclosed herein. Of course, the specific additive or additives employed will depend on the nature of the treatment, the exact nature of the composition, the type of formation, the temperature of the formation, and other factors that go into preparing a matrix acidizing job.

In some embodiments, the complexing-acidizing treatment fluids disclosed herein can be mixed at a remote location from a well site and shipped to the well site or, in other embodiments, the treatment fluids can mixed at the well site. In some embodiments, the complexing-acidizing treatment fluids may be mixed and pumped on-the-fly. As far as storage and shipping of these treatment fluids, one should be mindful that the chelating agent can only remain in solution at the low pH of the fluid for a certain amount of time before crystallizing. This crystallization tendency should be taken into account if shipping or storing a treatment fluid. Fluids having a lower molarity, for example 0.6 Molar, may be stable for a longer period of time than those fluids having a molarity of 1 or more. A person having ordinary skill in the art of designing such fluids with the benefit of this disclosure will be able to consider these factors and determine whether remote mixing or on-site mixing is most appropriate for a given job.

The methods of this invention for matrix acidizing a portion of a subterranean formation penetrated by a well bore may include the following steps. A complexing-acidizing treatment fluid is provided or prepared that comprises an aminopolycarboxylic acid chelating agent, an aqueous base fluid, an acid, and optionally, additional additives. Thereafter, at least a portion of the subterranean formation is contacted with the complexing-acidizing treatment fluid. In some embodiments, the fluid etches the formation matrix so as to form wormholes and/or channels in the matrix. In some embodiments, the subterranean formation may have a bottom hole temperature of up to about 325° F. In some embodiments, the chelating agent in the complexing-acidizing treatment fluid is able to react with the metal cations (resulting from the matrix dissolution), so as to form aggregate blocking agents that prevent fluid loss into the matrix and divert the complexing-acidizing treatment fluid into the channels so as to achieve a deeper radial penetration. Deeper penetration is qualitatively assessed based on a calculation of the amount of fluid injected, depth of the treated zone and matrix mineralogy/permeability. A "wormhole" model known in the art may be used to model this; for example, comparing treatments on core samples, if desired.

Another method disclosed herein comprises the steps: (a) providing a complexing-acidizing treatment fluid that comprises an aminopolycarboxylic acid chelating agent, an aqueous base fluid, an acid, and optionally, additional additives; and (b) contacting a portion of the subterranean formation with the complexing-acidizing treatment fluid. In some embodiments, the acid in the treatment fluid etches the formation surfaces present in the formation so as to provide conductive pathways, including channels and wormholes, for hydrocarbons to flow for production. The etching rate may be dependent on the reaction rate of the acid and the formation as related to the injection rate. In some embodiments, the subterranean formation may have a bottom hole temperature of about 250° F. or more.

An example of a method presented herein comprises the following steps: providing or preparing a complexing-acidizing treatment fluid that comprises: an aminopolycarboxylic acid chelating agent, an aqueous base fluid, and an acid, placing the complexing-acidizing treatment fluid in a subterranean formation matrix penetrated by a well bore; allowing the acid to generate metal ions by dissolution of the subterranean formation matrix; reacting the aminopolycarboxylic acid chelating agent with the metal ions so as to form aggregates; and allowing the aggregates to plug at least some pore throats in the formation matrix to divert the complexing-acidizing treatment fluid to a main channel distinct from the portion of the matrix in which the pore throats are plugged.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of components or ingredients, properties such as molecular weight, molarity, reaction conditions, and so forth, used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

Embodiments disclosed herein include methods comprising these steps in any order and in any combination: providing or preparing a complexing-acidizing treatment fluid that comprises: an aminopolycarboxylic acid chelating agent, an aqueous base fluid, and an acid, placing the complexing-acidizing treatment fluid in a subterranean formation matrix penetrated by a well bore; allowing the acid to generate metal cations by dissolution of the subterranean formation matrix; reacting the aminopolycarboxylic acid chelating agent with the metal cations so as to form at least a plurality aggregate blocking agents; and allowing the aggregate blocking agents to divert the complexing-acidizing treatment fluid to a main channel in the subterranean formation matrix that is distinct from a wormhole in the subterranean formation matrix.

Embodiments disclosed herein include methods comprising these steps in any order and in any combination: providing or preparing a complexing-acidizing treatment fluid that comprises: an aminopolycarboxylic acid chelating agent, an aqueous base fluid, and an acid, placing the complexing-acidizing treatment fluid in a subterranean formation matrix penetrated by a well bore; allowing the acid to generate metal cations by dissolution of the subterranean formation matrix; reacting the aminopolycarboxylic acid chelating agent with the metal cations so as to form at least a plurality of aggregate blocking agents; and allowing the aggregate blocking agents to plug at least some pore throats in the formation matrix.

Embodiments disclosed herein include complexing-acidizing treatment fluids comprising these components in any order and in any combination: A complexing-acidizing treatment fluid comprising: an aminopolycarboxylic acid chelating agent, an aqueous base fluid, and an acid, wherein the complexing-acidizing treatment fluid has a pH of less than about 2.

In any of the embodiments described herein, the acid may include any acid that can generate a pH of two (2) or lower given the other components in the complexing-acidizing treatment fluid; hydrochloric acid; formic acid; methanesulfonic acid; mono-chloroacetic acid; di-chloroacetic acid; tri-chloroacetic acid; trifluoroacetic acid; acetic acid; sulphonic acid; and any combination thereof.

In any of the embodiments described herein, the chelating agent comprises a chelating agent selected from the group consisting of: glutamic acid diacetic acid, methylglycine diacetic acid, ββ-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxyl)ethyl]glycine, N-bis[2-(1,2-dicarboxyethoxyl)ethyl]aspartic acid, N-bis[2-(1,2-dicarboxyethoxyl)ethyl]methylglycine, N-tris[(1,2-dicarboxyethoxy)ethyl]amine, N-bis[2-(carboxymethoxy) ethyl]glycine, N-bis[2-(methylcarboxymethoxy)ethyl] glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N, N'''-disuccinic acid, triethylenetetramine-N,N''''-disuccinic acid, 1,6-hexamethylenediamine-N,N'-disuccinic acid, tetraethylenepentamine-N,N''''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, propylenediaminetetraacetic acid, hydroxyethyliminodiacetic acid, diphenylaminesulfonic acid, hydroxamates, pyridinecarboxylic acids, any salt thereof, any derivative thereof, or any combination thereof that is soluble in a pH range of 0 to 2.

In any of the embodiments described herein, the concentration of the chelating agent in the treatment fluid may range between about 0.1% to about 40% of the treatment fluid by weight.

In any of the embodiments described herein, the aqueous base fluid comprises a fluid selected from the group consisting of: fresh water, acidified water, salt water, seawater, brine, a saturated salt solution, an aqueous salt solution, a non-saturated salt solution, a glycol, a glycol ether, and any combination thereof.

In any of the embodiments described herein, the aqueous base fluid is present in an amount of up to about 75% by weight of the treatment fluid.

In any of the embodiments described herein, the complexing-acidizing treatment fluid further comprises an additive selected from the group consisting of: a biocide, a corrosion inhibitors, a salt, a friction reducer, an anti-sludging additive, a surfactant, and any combination thereof.

In various embodiments, systems configured for delivering the complexing-acidizing treatment fluids described herein to a downhole location are described. In various embodiments, the systems can comprise a pump fluidly coupled to a tubular, the tubular containing a complexing-acidizing treatment fluid of the present invention that comprises an aminopolycarboxylic acid chelating agent, an aqueous base fluid, an acid, and optionally, additional additives. In some instances, the tubular may include a coiled tubing.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the complexing-acidizing treatment fluid to a subterranean formation at or above a fracture gradient of the subterranean formation, but it may also be used in cases where fracturing is not desired. Generally, these treatment fluids will likely not be injected at pressures above the fracture gradient. In some embodiments, the high pressure pump may be capable of fluidly conveying the complexing-acidizing treatment fluids into the subterranean formation. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of the treatment fluid before it reaches the high-pressure pump.

In some embodiments, the systems described herein can further comprise a mixing tank (e.g., 106 in FIG. 1) that is upstream of the pump and in which the complexing-acidizing treatment fluids may be formulated. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated off-site and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 2:
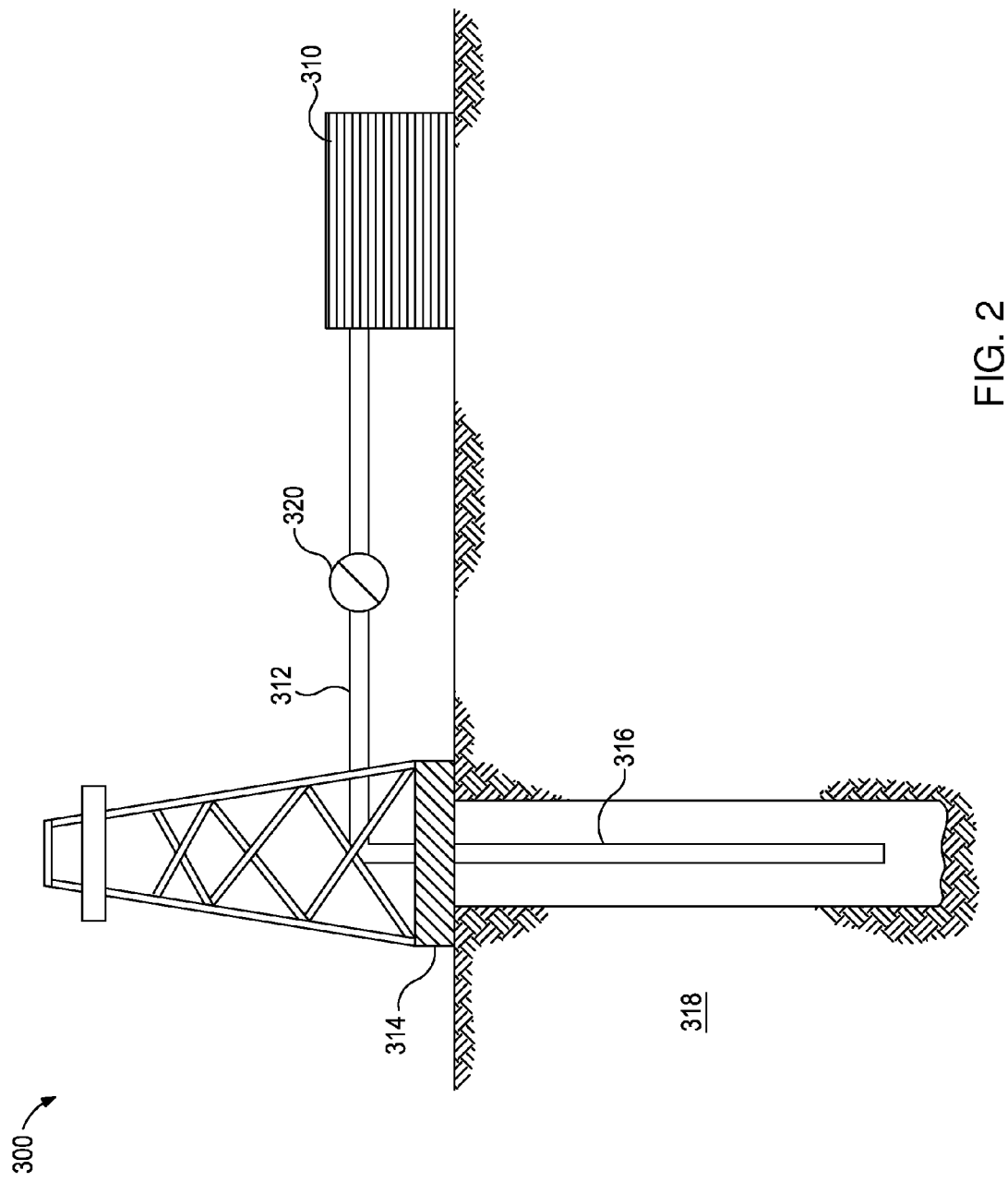
FIG. 2 shows an illustrative schematic of a system that can deliver complexing-acidizing treatment fluids disclosed herein to a downhole location, according to one or more embodiments.

FIG. 2 shows an illustrative schematic of a system that can deliver complexing-acidizing treatment fluids disclosed herein to a downhole location, according to one or more embodiments. It should be noted that while FIG. 2 generally depicts a land-based system, it is to be recognized that like systems may be operated in subsea locations as well. As depicted in FIG. 2, system 300 may include mixing tank 310, in which a complexing-acidizing treatment fluid may be formulated. The complexing-acidizing treatment fluid may be conveyed via line 312 to wellhead 314, where the treatment fluid enters tubular 316, tubular 316 extending from wellhead 314 into subterranean formation 318. Upon being ejected from tubular 316, the complexing-acidizing treatment fluid may subsequently penetrate into subterranean formation 318. Pump 320 may be configured to raise the pressure of the treatment fluid to a desired degree before its introduction into tubular 316. It is to be recognized that system 300 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the complexing-acidizing treatment fluids may, in some embodiments, flow back to wellhead 314 and exit subterranean formation 318. In some embodiments, the complexing-acidizing treatment fluids that have flowed back to wellhead 314 may subsequently be recovered and recirculated to subterranean formation 318. In some embodiments, the complexing-acidizing treatment fluids may be recycled if the acid and/or chelating agent has not been fully spent.

It is also to be recognized that the disclosed treatment fluids may also directly or indirectly affect the various downhole equipment and tools that may come into contact with the treatment fluids during operation, at least partially, due to the low pH of the treatment fluids. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

One or more illustrative embodiments incorporating the complexing-acidizing treatment fluids disclosed herein are presented below. Not all features of an actual implementation are described or shown in this application for the sake of clarity. It is understood that in the development of an actual embodiment incorporating the complexing-acidizing treatment fluids, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

Embodiments disclosed herein include:

A. A method comprising providing or preparing a complexing-acidizing treatment fluid having an acid concentration of about 0.6 Molar. Wherein the complexing-acidizing treatment fluid comprises: an aminopolycarboxylic acid chelating agent, an aqueous base fluid, and an acid. Then placing the complexing-acidizing treatment fluid in a subterranean formation matrix penetrated by a well bore and allowing the acid to generate metal cations by dissolution of the subterranean formation matrix. And reacting the aminopolycarboxylic acid chelating agent with the metal cations so as to form at least a plurality aggregate blocking agents. And allowing the aggregate blocking agents to divert the complexing-acidizing treatment fluid to a main channel in the subterranean formation matrix that is distinct from a wormhole in the subterranean formation matrix.

B. A method comprising providing or preparing a complexing-acidizing treatment fluid having a pH of about 2 or less. Wherein the complexing-acidizing treatment fluid comprises: an aminopolycarboxylic acid chelating agent, an aqueous base fluid, and an acid. Then placing the complexing-acidizing treatment fluid in a subterranean formation matrix penetrated by a well bore and allowing the acid to generate metal cations by dissolution of the subterranean formation matrix. And then reacting the aminopolycarboxylic acid chelating agent with the metal cations so as to form at least a plurality of aggregate blocking agents; and allowing the aggregate blocking agents to plug at least some pore throats in the formation matrix.

C. A method comprising providing or preparing a complexing-acidizing treatment fluid having a pH of about 2 or less. Wherein the complexing-acidizing treatment fluid comprises: an aminopolycarboxylic acid chelating agent, an aqueous base fluid, and an acid. Then placing the complexing-acidizing treatment fluid in a subterranean formation matrix penetrated by a well bore and allowing the acid to generate metal cations by dissolution of the subterranean formation matrix. Then reacting the aminopolycarboxylic acid chelating agent with the metal cations so as to form at least a plurality of aggregate blocking agents; and allowing the aggregate blocking agents to reduce the loss of the complexing acidizing treatment fluid into the subterranean formation matrix proximate to a main channel.

D. A complexing-acidizing treatment fluid comprising: an aminopolycarboxylic acid chelating agent, an aqueous base fluid, and an acid, wherein the complexing-acidizing treatment fluid has a pH of less than about 2.

E. A system comprising: a mixing tank, the mixing tank containing a complexing-acidizing treatment fluid that comprises an aminopolycarboxylic acid chelating agent, an aqueous base fluid and an acid, and wherein the complexing-acidizing treatment fluid has a pH of less than about 2; a well head; and a tubing defining at least one orifice through which the complexing-acidizing treatment fluid can enter a subterranean formation matrix.

Each of embodiments A, B, C, D, and E may have one or more of the following additional elements in any combination:

Element 1: wherein the acid comprises an acid selected from the group consisting of: an acid that can generate a pH of two (2) or lower given the other components in the complexing-acidizing treatment fluid; hydrochloric acid; formic acid; methanesulfonic acid; mono-chloroacetic acid; di-chloroacetic acid; tri-chloroacetic acid; trifluoroacetic acid; acetic acid; sulphonic acid; and any combination thereof Element 2: wherein the chelating agent comprises a chelating agent selected from the group consisting of: glutamic acid diacetic acid, methylglycine diacetic acid, ββ-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-bis[2-(carboxymethoxy)ethyl]glycine, N-bis[2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, propylenediaminetetraacetic acid, hydroxyethyliminodiacetic acid, diphenylaminesulfonic acid, hydroxamates, pyridinecaroboxylic acids, any salt thereof, any derivative thereof, or any combination thereof that is soluble in a pH range of 0 to 2

Element 3: wherein the concentration of the chelating agent in the treatment fluid may range between about 0.1% to about 40% of the treatment fluid by weight Element 4: wherein the aqueous base fluid comprises a fluid selected from the group consisting of: fresh water, acidified water, salt water, seawater, brine, a saturated salt solution, an aqueous salt solution, a non-saturated salt solution, a glycol, a glycol ether, and any combination thereof Element 5: wherein the aqueous base fluid is present in an amount of up to about 75% by weight of the treatment fluid.

Element 6: wherein the complexing-acidizing treatment fluid further comprises an additive selected from the group consisting of: a biocide, a corrosion inhibitor, a salt, a friction reducer, an anti-sludging additive, a surfactant, and any combination thereof While any combination of the above is specifically contemplated herein, by way of non-limiting example, exemplary combinations applicable to A, B, C include: A, B, C, D, or E with 1 and 2; A, B, C, D, or E with 1 and 3; and A, B, C, D, or E with 2 and 3.

To facilitate a better understanding of the present invention, the following examples of preferred or representative embodiments are given. In no way should the following examples be read to limit, or to define, the scope of the invention.

EXAMPLES

Experimental 1

Solutions were mixed using the following mixing order: a 40% concentrated solution of MGDA chelating agent was diluted with approximately 90% of total water volume, and then acidified with concentrated HCl to the desired pH, and then finished dilution with water to the final volume. Before the addition of other components, the solution was a clear fluid, and its pH was 0. After adding $CaCO_3$ powder a cloudier fluid with a pH of 1.3 resulted. The addition of the $CaCO_3$ powder was done in the following order (for solution number 5 in Table 1 below and similarity for the other solutions): 10 g of $CaCO_3$ added, delay time of 30 min.; 5 g of $CaCO_3$ added, second delay period of 10 min.; 1 g of $CaCO_3$ added, delay period of 10 min.; 1 g of $CaCO_3$ added, delay period of 10 min and finally added 0.0584 g $CaCO_3$. Persistent cloudiness was observed at this point. At this point, the addition of $CaCO_3$ was ceased, and 50% NaOH solution was added to raise the pH. The solution became even cloudier to an opaque white/pink (with heavy precipitation noted at a pH of 2) from the starting pH of 1.07 to almost a pH of 5. After 1-2 minutes, the solution became clear, approximately at a pH of 5 to 5.5. For solution 6, a total of about 16 ml of NaOH over a period of 15 to 20 minutes was used to reach a pH of 5.45. Some cloudiness was observed in the end solution after it was allowed to rest for a short time (approximately 30 minutes) after mixing was stopped. The pH remained the same during this transition. It was noted during the testing of solution #6 that increased amounts of calcium appear to lead to greater precipitation development during the transition phase. It was also observed that any precipitation could be removed either by controlling the pH or by dilution with water.

Table 1 below shows the specific details of the fluids tested.

TABLE 1

| Fluid # | pH | Volume to make 0.6M MGDA | HCl (mL) | $H_2O$ (mL) | Amount of $CaCO_3$ added (g) | $pH_i$ | $pH_f$ | $pH_f$ after raised w/ NaOH | Total initial vol (mL) |
|---|---|---|---|---|---|---|---|---|---|
| 1 | −0.5 | 77.50 | 62.00 | 110.50 | 20.00 | −0.23 | 1.06 | n/a | 250 |
| 2 | 0 | 77.50 | 51.00 | 122.50 | 12.4636 | 0.30 | 1.30 | n/a | 250 |
| 3 | 1 | 77.50 | 36.00 | | | 1.14 | | | |
| 4 | 2 | 77.50 | 24.00 | | | 2.02 | | | |
| 5 | −0.5 | 77.50 | 60.00 | 112.50 | 17.06 | −0.38 | 1.07 | 5.45 | 250 |
| 6 | 0 | 77.50 | 50.00 | 122.50 | 12.46 | 0.35 | 1.27 | 5.50 | 250 |

Experimental 2

Filter Loss Test

Testing was conducted on a Fann Permeability Plugging Apparatus (Part No. 206845). The testing was conducted with 50 psi of pressure at room temperature. Filter disks of 5 and 10 microns were used to determine filtration efficiency of exemplary complexing-acidizing fluids as disclosed herein. Testing was conducted to determine how long it took for 100 mL of solution 1 or solution 2 to completely pass through/plug off each filtration disk. Measurements of mass were made before and after for each disk to determine how much filtrate was captured by each filter. Tables 2, 3 and 4 below illustrate the observations.

TABLE 2

| 10 Micron Filtration | |
|---|---|
| Fluid No. 5 (see Table 1) | 100 ML |
| 10 micron disk initial weight | 39.07 g |
| 10 micron disk final weight | 40.716 g |
| Total Mass of Filtrate | 1.6464 g |
| Time for Fluid No. 5 Expulsion | 12.23 sec |

Relative to Table 2, the visual observation was that the filter appeared clean after the test and the solution retained its initial color and cloudiness.

TABLE 3

| 5 Micron Filtration | |
| --- | --- |
| Fluid No. 5 (see Table 1) | 100 ML |
| 5 micron disk initial weight | 38.99 g |
| 5 micron disk final weight | 40.616 g |
| Total Mass of Filtrate | 1.626 g |
| Time for Fluid No. 5 Expulsion | 11.71 sec |
| Time for fluid expulsion of water blank | 7.21 sec |

Relative to Table 3, the visual observation was that the filter appeared clean after the test and the solution retained its initial color and cloudiness.

TABLE 4

| 5 Micron Filtration | |
| --- | --- |
| Fluid No. 5 (see Table 1) | 100 ML |
| 5 micron disk initial weight | 38.67 g |
| 5 micron disk final weight | 49.197 g |
| Total Mass of Filtrate | 10.527 g |
| Time for Fluid No. 5 Expulsion | 8.5 sec |
| Time for fluid expulsion of water blank | 7.31 sec |

Relative to Table 4, the visual observation was that an about ½" filter cake formed on the disk. The fluid was clear after filtration.

Experimental 3

Particle Size Analysis

Figure 3A:
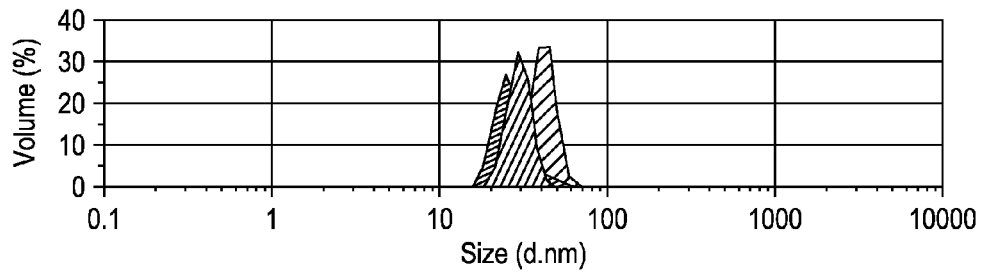
FIGS. 3A and 3B illustrate particle size distribution for a 5-micron and 10-micron filtration as described in the Examples section.
Figure 3B:
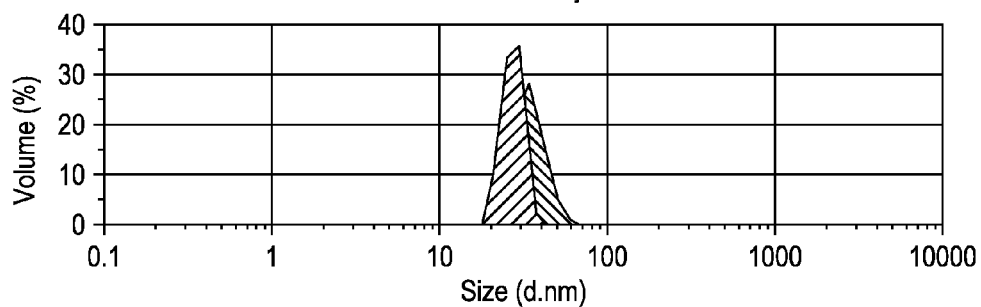
Figure 4:
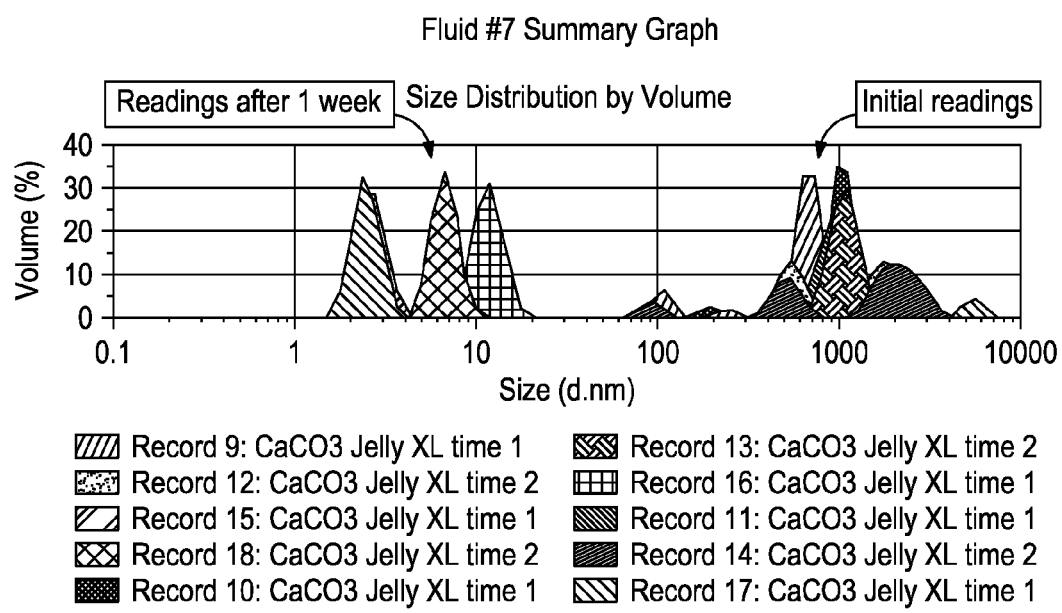
FIG. 4 illustrates unfiltered reaction products as described in the Examples section.

The two different filtered solutions (Fluid No. 5 as filtered by the 5 micron and the 10 micron filters in the Filter Loss Test above) were diluted 50/50 with reverse osmosis milliQ water for testing purposes to check particle size in the final solution. A Malvern Zetasizer Model ZEN3600 dynamic light scattering instrument was used to measure particle size at room temperature. Fluid No. 7 was unfiltered and was run undiluted on the dynamic light scattering instrument to observe particle size development over time. It was observed that particle size decreased as a result of time with the fluid at rest. FIGS. 3A and 3B indicate the observed data for Fluid 5 through the 10 micron disc and the 5 micron disc, respectively. FIG. 4 illustrates particle size distribution by volume.

Experimental 4

Aloxite Core Plugging/Regain Experiments

A highly permeable Aloxite core (~1,250 mD) with a measured porosity of 11.24% (volume 23.139 mL) was plugged with the aggregate blocking agents to better understand the pore size and fluid dynamics through an essentially non-reactive core. Through particle size measurement, it was determined that these agents are thought to be or include nanoparticles. Fluid 1 from above was prepared and flowed through the Aloxite core after stable, pre-treatment brine permeability was determined. Flow was continued until the core had essentially been plugged, which was near a permeability of about 0.152 mD. This was determined by a change in differential pressure across the core. At this point the core was removed, dried and weighed to determine the amount of aggregate blocking agents that persisted/remained in the core after the treatment/plugging stage.

Upon drying, the mass of the core was measured and a gain in mass of 9.4822 g was indicated. This is believed to be due to the aggregate blocking agents plugging the pore throats within the core. This is interesting because the core was plugged without the total volume of porosity being filled, therefore, indicating an ability of the aggregate blocking agent to plug pore throats in the core.

To explore the scope of the functionality of the aggregate blocking agents, another Aloxite core was chosen with similar porosity but with a lower permeability (~600 mD). The same procedure was followed from before where the nanoparticles were flowed at 125° F. until the core plugged as determined from increase in the differential pressure and/or lowered permeability. Upon plugging, the core was allowed to remain at temperature for 30 minutes at which point 3% KCl was flowed. In less than one minute the core began to unplug dramatically and around 35 minutes the regain neared about 50% of the original permeability of the untreated core. Brine regain flow was continued, and with an additional 40 minutes, 100% of the original permeability had returned.

The results appear to indicate the ability of the aggregate blocking agents to be cleaned out of the core without the aid of any additional breaker or chemicals, which is an advantage over traditional fluid loss control techniques involving gels. This highlights the fact that a typical overflush or production of formation water will remove the aggregate blocking agents blocking the natural permeability of the formation being treated.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing or preparing a complexing-acidizing treatment fluid having a pH of about 2 or less and comprising:
      an aminopolycarboxylic acid chelating agent, any salt thereof, or any derivative thereof,
      an aqueous base fluid, and
      an acid having a concentration of at least about 0.6 Molar in the complexing-acidizing treatment fluid;
   placing the complexing-acidizing treatment fluid in a carbonate subterranean formation matrix penetrated by a well bore;
   allowing the acid in a first portion of the treatment fluid to generate metal cations by dissolution of a first portion of the subterranean formation matrix;
   reacting the aminopolycarboxylic acid chelating agent in the first portion of the treatment fluid with the metal cations so as to form at least a plurality of aggregate blocking agents in wormholes within the carbonate subterranean formation matrix; and
   allowing the plurality of aggregate blocking agents to divert a second portion of the complexing-acidizing treatment fluid to a main channel in a second portion of the carbonate subterranean formation matrix that is distinct from the wormholes.

2. The method of claim 1 wherein the acid comprises an acid selected from the group consisting of an acid that can generate a pH of two or lower in the complexing-acidizing treatment fluid, hydrochloric acid, formic acid, methanesulfonic acid, mono-chloroacetic acid, di-chloroacetic acid, tri-chloroacetic acid, trifluoroacetic acid, acetic acid, sulphonic acid, and any combination thereof.

3. The method of claim 1 wherein the aminopolycarboxylic acid chelating agent comprises a chelating agent selected from the group consisting of glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-bis [2-(carboxymethoxy)ethyl]glycine, N-bis[2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine- N, N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, propylenediaminetetraacetic acid, hydroxyethyliminodiacetic acid, diphenylaminesulfonic acid, hydroxamates, pyridinecarboxylic acids, and any combination thereof that is soluble in a pH range of 0 to 2.

4. The method of claim 1 wherein a concentration of the aminopolycarboxylic acid chelating agent in the complexing-acidizing treatment fluid ranges between about 0.1% to about 40% of the complexing-acidizing treatment fluid by weight.

5. The method of claim 1 wherein the aqueous base fluid comprises a fluid selected from the group consisting of fresh water, acidified water, salt water, seawater, brine, a saturated salt solution, an aqueous salt solution, a non-saturated salt solution, a glycol, a glycol ether, and any combination thereof.

6. The method of claim 1 wherein the aqueous base fluid is present in an amount of up to about 75% by weight of the complexind-acidizing treatment fluid.

7. The method of claim 1 wherein the complexing-acidizing treatment fluid further comprises an additive selected from the group consisting of a biocide, a corrosion inhibitor, a salt, a friction reducer, an anti-sludging additive, a surfactant, and any combination thereof.

8. A method comprising:
   providing or preparing a complexing-acidizing treatment fluid having a pH of about 2 or less, the complexing-acidizing treatment fluid comprising:
      an aminopolycarboxylic acid chelating agent, any salt thereof, or any derivative thereof,
      an aqueous base fluid, and
      an acid;
   placing the complexing-acidizing treatment fluid in a carbonate subterranean formation matrix penetrated by a well bore;
   allowing the acid to generate metal cations by dissolution of the carbonate subterranean formation matrix;
   reacting the aminopolycarboxylic acid chelating agent with the metal cations so as to form at least a plurality of aggregate blocking agents in wormholes within the carbonate subterranean formation matrix; and
   allowing the aggregate blocking agents to plug at least some pore throats in the formation matrix.

9. The method of claim 8 wherein the acid comprises an acid selected from the group consisting of: an acid that can generate a pH of two or lower in the complexing-acidizing treatment fluid, hydrochloric acid, formic acid, methanesulfonic acid, mono-chloroacetic acid, di-chloroacetic acid, tri-chloroacetic acid, trifluoroacetic acid, acetic acid, sulphonic acid, and any combination thereof.

10. The method of claim 8 wherein the aminopolycarboxylic acid chelating agent comprises a chelating agent selected from the group consisting of glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl]aspartic acid, N-bis[2-(1,2-dicarboxyethoxy)ethyl]methylglycine, N-tris[(1,2-dicarboxyethoxy)ethyl]amine, N-bis[2-(carboxymethoxy)ethyl]glycine, N-bis[2-(methylcarboxymethoxy)ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, propylenediaminetetraacetic acid, hydroxyethyliminodiacetic acid, diphenylaminesulfonic acid, hydroxamates, pyridinecarboxylic acids, and any combination thereof that is soluble in a pH range of 0 to 2.

11. The method of claim 8 wherein a concentration of the aminopolycarboxylic acid chelating agent in the complexing-acidizing treatment fluid ranges between about 0.1% to about 40% of the complexing-acidizing treatment fluid by weight.

12. The method of claim 8 wherein the aqueous base fluid comprises a fluid selected from the group consisting of fresh water, acidified water, salt water, seawater, brine, a saturated salt solution, an aqueous salt solution, a non-saturated salt solution, a glycol, a glycol ether, and any combination thereof.

13. The method of claim 8 wherein the aqueous base fluid is present in an amount of up to about 75% by weight of the complexing-acidizing treatment fluid.

14. The method of claim 8 wherein the complexing-acidizing treatment fluid further comprises an additive selected from the group consisting of a biocide, a corrosion inhibitor, a salt, a friction reducer, an anti-sludging additive, a surfactant, and any combination thereof.

15. A method comprising:
providing or preparing a complexing-acidizing treatment fluid having a pH of about 2 or less, the complexing-acidizing treatment fluid comprising:
an aminopolycarboxylic acid chelating agent, any salt thereof, or any derivative thereof,
an aqueous base fluid, and
an acid;
placing the complexing-acidizing treatment fluid in a carbonate subterranean formation matrix penetrated by a well bore;
allowing the acid in a first portion of the treatment fluid to generate metal cations by dissolution of a portion of the carbonate subterranean formation matrix;
reacting the aminopolycarboxylic acid chelating agent in the first portion of the treatment fluid with the metal cations so as to form at least a plurality of aggregate blocking agents in wormholes within the carbonate subterranean formation matrix; and
allowing the plurality of aggregate blocking agents to reduce the loss of a second portion of the complexing-acidizing treatment fluid into the wormholes within the carbonate subterranean formation matrix that are proximate to a main channel of the carbonate subterranean formation matrix.

16. The method of claim 15 wherein the acid comprises an acid selected from the group consisting of an acid that can generate a pH of two or lower in the complexing-acidizing treatment fluid, hydrochloric acid, formic acid, methanesulfonic acid, mono-chloroacetic acid, di-chloroacetic acid, tri-chloroacetic acid, trifluoroacetic acid, acetic acid, sulphonic acid, and any combination thereof.

17. The method of claim 15 wherein the aminopolycarboxylic acid chelating agent comprises a chelating agent selected from the group consisting of glutamic acid diacetic acid, methylglycine diacetic acid, β-alanine diacetic acid, ethylenediaminedisuccinic acid, S,S-ethylenediaminedisuccinic acid, iminodisuccinic acid, hydroxyiminodisuccinic acid, polyamino disuccinic acids, N-bis[2-(1,2-dicarboxyethoxy)ethyl]glycine, N-bis[2-(1,2-dicarboxyethoxy)ethyl] aspartic acid, N-bis[2-(1,2-dicarboxyethoxy)ethyl]methylglycine, N-tris[(1,2-dicarboxyethoxy)ethyl]amine, N-bis[2-carboxymethoxy)ethyl]glycine, N-bis[2-(methylcarboxymethoxy) ethyl]glycine, N-methyliminodiacetic acid, iminodiacetic acid, N-(2-acetamido)iminodiacetic acid, hydroxymethyl-iminodiacetic acid, 2-(2-carboxyethylamino) succinic acid, 2-(2-carboxymethylamino) succinic acid, diethylenetriamine-N,N'-disuccinic acid, triethylenetetramine-N,N'''-disuccinic acid, 1,6-hexamethylenediamine-N,N'-disuccinic acid, tetraethylenepentamine- N, N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, propylenediaminetetraacetic acid, hydroxyethyliminodiacetic acid, diphenylaminesulfonic acid, hydroxamates, pyridinecarboxylic acids, and any combination thereof that is soluble in a pH range of 0 to 2.

18. The method of claim 15 wherein the complexing-acidizing treatment fluid further comprises an additive selected from the group consisting of a biocide, a corrosion inhibitor, a salt, a friction reducer, an anti-sludging additive, a surfactant, and any combination thereof.

* * * * *